United States Patent Office 2,956,997
Patented Oct. 18, 1960

2,956,997

SUBSTITUTED 3,5-DIOXO-TETRAHYDRO-1,2,6-THIADIAZINE-1,1-DIOXIDES

Helmut Teufel, Biberach (Riss), Germany, assignor to Geigy Chemical Corporation, New York, N.Y., a corporation of Delaware No Drawing. Filed Mar. 24, 1958, Ser. No. 723,155

Claims priority, application Switzerland, Apr. 4, 1957

4 Claims. (Cl. 260—243)

The present invention concerns new substituted 3.5-dioxotetrahydro-1.2.6-thiadiazine-1.1-dioxides and the salts thereof which have valuable pharmacological properties, as well as processes for the production of these compounds.

It has surprisingly been found that substituted 3.5-dioxotetrahydro-1.2.6-thiadiazine-1.1-dioxides of the general formula:

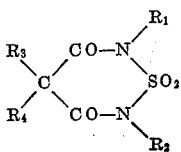

wherein:

$R_1$ represents an aromatic or araliphatic hydrocarbon radical which can have halogen atoms, nitro groups, alkoxy or alkylmercapto groups as substituents, $R_2$ represents hydrogen or a hydrocarbon radical which can have halogen atoms, nitro groups, alkoxy or alkylmercapto groups as substituents, $R_3$ represents hydrogen or a hydrocarbon radical which can have halogen atoms, hydroxyl, oxo, amino or nitro groups as substituents; and can contain as chain or ring members O, S, SO, $SO_2$ or NH instead of methylene groups or —N= instead of methine groups, and $R_4$ represents hydrogen or a hydrocarbon radical not aromatically bound but otherwise corresponding to the definition of $R_3$, as well as the salts formed with inorganic and organic bases of these compounds in which at least one of the radicals $R_2$, $R_3$ and $R_4$ is hydrogen, have valuable pharmacological properties, in particular a very marked antiphlogistic as well as antipyretic and analgetic activity and are suitable, for example, for the treatment of rheumatic complaints.

The compounds defined above are produced in a simple manner by reacting a malonic acid of the general formula:

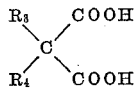

or a reactive functional derivative of such an acid with a substituted sulphamide of the general formula:

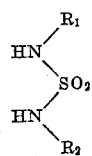

or with an N-acyl derivative of such a sulphamide, the reaction being performed if necessary in the presence of a basic or acid condensing agent. In the above Formulae II and III, $R_1$, $R_2$, $R_3$ and $R_4$ have the meanings given in general Formula I but the starting materials are advantageously so chosen that at least one of the radicals $R_2$, $R_3$ and $R_4$ in these formulae is hydrogen. In reacting free malonic acids of the general Formula II with free sulphamides, in particular acid agents such as e.g. polyphosphoric acid or inorganic acid halides can be used as condensing agent, e.g. phosphorus trichloride or phosphorus oxychloride in excess without further diluting agents or the theoretical amount of phosphorus oxychloride in halogenated hydrocarbons such as chloroform or ethylene chloride as solvent. Malonic acid dihalides and mixed anhydrides of malonic acid with, for example acetic acid, can be reacted at temperatures of about 0–100° with free sulphamides in the presence of tertiary organic bases such as pyridine, dimethyl aniline or triethylamine, for example in an ether such as diethyl ether or di-isopropyl ether or in benzene hydrocarbons such as benzene, toluene or xylene as solvent. Malonic acid dihalides however, react at somewhat higher temperatures, of about 20° to about 120°, with free sulphamides, this already in the absence of condensing agents. Malonic acid diesters, malonic acid semi-esters, malonic acid monoester nitriles (cyanoacetic acid esters) and free malonic acid nitriles (cyanoacetic acids) can be reacted with the free sulphamides or the N-acyl derivatives thereof in the presence of alkali metal alcoholates. In suitable cases they can also be reacted with the use of acid condensing agents such as phosphorus oxychloride or polyphosphoric acid, or by heating the components without additives to temperatures between 60 and 180°. Non-symmetrical functional derivatives possibly necessitate a two-step reaction or the addition of two different condensing agents, one after the other. Thus, for example, imino-oxo compounds formed from malonic acid mononitriles or esters thereof as immediate condensation product must be hydrolysed to form the corresponding dioxo compounds and, on using monoester halides, first the acid halide group is reacted with the sulphamide in the presence of tertiary organic bases and then the ring is closed by means of an alkali metal alcoholate.

The following substituted malonic acids and the reactive functional derivatives thereof for example can be used as starting materials of the general Formula II in addition to the unsubstituted malonic acid: alkyl malonic acids such as e.g. methyl, ethyl, n-propyl, isopropyl, n-butyl-, isobutyl, tert. butyl, n-amyl, isoamyl, n-hexyl, n-octyl, [2-ethyl-hexyl], n-dodecyl and n-octadecyl malonic acid; alkenyl and alkinyl malonic acids such as e.g. allyl, crotyl, methallyl and propargyl malonic acid; alkoxyalkyl and alkylmercaptoalkyl malonic acids such as e.g. ethoxyethyl, n-butoxyethyl, methylmercapto-ethyl and isopropyl-mercapto-ethyl malonic acid; alkylaminoalkyl and dialkylaminoalkyl malonic acids such as e.g. dimethylaminoethyl and diethylaminoethyl malonic acid; cycloalkyl and cycloalkenyl malonic acids such as e.g. cyclopentyl, cyclohexyl, $\Delta^1$-cyclohexenyl, cyclohexylmethyl, [2.5-endomethylene-cyclohexyl-methyl] and [2.5-endomethylene-$\Delta^3$-cyclohexenyl] malonic acid; aryl, aralkyl and aralkenyl malonic acids such as e.g. phenyl, p-tolyl, p-anisyl, [p-chlorophenyl], [p-bromophenyl], [m-nitrophenyl], [p-nitrophenyl], α-naphthyl, β-naphthyl, benzyl, [p-chlorobenzyl], [β-phenyl-ethyl], [γ-phenylpropyl], α-menaphthyl and cinnamyl malonic acid; malonic acids having substituents containing a hetero atom or hetero atom group such as e.g. phenoxyethyl, phenylmercaptoethyl, phenylsulphinylethyl, phenylsulphonylethyl, fufuryl, tetrahydrofurfuryl, [δ-tetrahydropyranyloxy-butyl], [γ.γ-ethylenedioxyl-butyl], thienyl, piperidino-ethyl, [pyridyl-(4)-methyl], [γ-pyridyl-(2)-mercapto-propyl] and benzthiazolylmercapto-ethyl malonic acid. Examples of suitably substituted sulphamides of the general formula III are phenyl-sulphamide, benzyl sulphamide, sulphanilide, N-phenyl-N'-p-tolyl sulphamide, N-phenyl-N'-[m-nitrophenyl]-sulphamide, N-phenyl-N'-p-anisyl sulphamide, N-phenyl - N' - [p-chlorophenyl]-sulphamide, N-phenyl-N'-(3.5 - dichlorophenyl) - sulphamide, N-phenyl-N'-benzyl sulphamide, N.N' - dibenzyl sulphamide, N - benzyl-N-cyclohexyl sulphamide, N-benzyl-N'-n-butyl sulphamide, N-phenyl-N'-cyclohexyl sulphamide, N-phenyl-N'-methyl sulphamide, N-phenyl-N'-n-butyl sulphamide and N-phenyl-N'-allyl sulphamide. Aryl substituted sulphamides are obtained for example by reacting sodium salts of formarylides with sulphuryl chloride and then reacting the N-chlorosulphonyl formarylides obtained with ammonia or with aliphatic, cycloaliphatic, aromatic or araliphatic primary amines. The reaction of sulphuryl chloride with excess arylamines, if necessary in pyridine solution leads to starting materials having identical radicals $R_1$ and $R_2$. These are also obtained by reacting chlorosulphonic acid phenyl esters with reactive primary amines such as, for example, benzylamine.

Furthermore, compounds of the general Formula I are also produced by reacting a reactive ester of an alcohol of the general formula:

$$R'_4\text{—OH} \qquad \text{IV}$$

with a compound falling under the general formula:

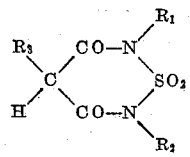

V preferably in the presence of a basic condensing agent, or with a salt of a compound of the generally Formula V.

In the Formulae IV and V, $R_1$, $R_2$ and $R_3$ have the meanings given in general Formula I and $R'_4$ has the meaning of $R_4$ in that formula, naturally with the exception of hydrogen. In general, the halides are used as reactive esters, also, for example, aryl sulphonic acid esters and neutral, as well as acid sulphuric acid esters can be used when the meaning of $R'_4$ is limited to suitable radicals.

Examples of suitable reactive esters are methyl bromide, methyl iodide, ethyl bromide, ethyl iodide, n-butyl bromide, allyl bromide, crotyl bromide, propargyl bromide, δ-bromobutanol, diethylaminoethyl chloride, chloroaceto-diethylamide, cyclopentyl bromide, cyclohexyl bromide, $\Delta^2$-cyclohexenyl bromide, benzyl chloride, benzyl bromide, 2.4 - dinitrobenzyl chloride, ω - bromo-acetophenone, α-bromoacetanilide, dimethyl sulphate and diethyl sulphate.

In this process in particular the alkali metal alcoholates are suitable as basic condensing agents. On using reactive esters, the reaction can be performed already at room temperature or also at a raised temperature. However, to avoid a partial alcoholysis of the starting material of the general Formula V, it is advantageous with higher temperatures to use, for example, tertiary butanol as solvent instead of methanol or ethanol and also to use salts produced before the reaction, for example alkali metal salts of these starting materials. In this manner also radicals $R_4$ can be introduced which contain the functional groups listed in the definition of $R_4$.

This process is the most suitable for the production of 2.4.4.6-tetra-substituted 3.5-dioxo-tetrahydro-1.2.6-thiadiazine-1.1-dioxides.

Another process which is related to that above can be used but only however for the production of compounds monosubstituted in the 4-position and advantageously having, in all, three ring substituents. This process consists in condensing a compound obtained according to the first process described above of the general formula:

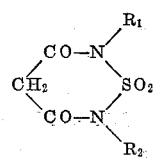

VI wherein $R_1$ and $R_2$ have the meanings given in Formula I, with an oxo compound of the general formula:

$$R''_4\text{=O} \qquad \text{VII}$$

wherein $R''_4$ represents a geminate divalent hydrocarbon radical which can contain halogen atoms, nitro groups or hydroxyl groups as substituents and as chain or ring members O or NH instead of methylene radicals and —N= instead of methine groups, and either simultaneously or subsequently reacting with catalytically activated hydrogen.

The condensation can be performed for example by heating a 2.6-disubstituted 3.5-dioxo-tetrahydro-1.2.6-thiadiazine-1.1-dioxide of the general Formula VI with a suitable oxo compound such as, for example, benzaldehyde, m-nitrobenzaldehyde, p-dimethylamino-benzaldehyde, cinnamaldehyde, croton aldehyde, furfurol, acetone or cyclohexanone, and with condensing agents, advantageously acid, for example, glacial acetic acid or p-toluene sulphonic acid, and then reacting the condensation product obtained which has a semicyclic double linkage with hydrogen, for example in the presence of palladium on calcium carbonate, in ethanolic solution at room temperature.

When aliphatic double linkages are present at the same time, in many cases the hydrogenation thereof is unavoidable so that this process is less suitable for the production of end compounds the side chains of which should contain aliphatic double linkages. On the other hand, in the production of end compounds not having aliphatic double linkages, the greater reactivity of unsaturated aldehydes in the condensation can be of interest and can justify their use instead of the corresponding saturated aldehydes.

Finally, in general compounds of the general Formula I which contain in any one or in several of the radicals $R_1$, $R_2$, $R_3$ and $R_4$ poly-linkages, e.g. aliphatic double linkages and/or triple linkages, can be hydrogenated with catalytically activated hydrogen to form compounds of the general Formula I without or with only a reduced number of such double and triple linkages. Such hydrogenations are performed for example in ethanol as solvent. If the starting compound is at most trisubstituted, it can also be hydrogenated in aqueous/alcoholic alkali lye as solvent in which case for example palladium on calcium carbonate or barium carbonate can be used as catalyst.

Another way of producing a group of compounds of the general Formula I in the radical $R_4$ and possibly also the radical $R_3$ of which the methylene group or methine group in the β-position is replaced by NH or N respectively, consists in reacting a compound of the general Formula V given above with formaldehyde and a nitrogen compound of the general formula:

VIII wherein $R_5$ and $R_6$ represent hydrogen or hydrocarbon radicals whereby the latter can be bound to each other direct or by way of an oxygen atom and can contain as substituents halogen atoms, hydroxyl or oxo groups and as chain or ring members O, S, SO, $SO_2$ or NH instead of methylene groups and N instead of methine groups, the reaction being performed either simultaneously or in any order desired. The resultant compounds correspond to the limited formula given below which falls under the general Formula I:

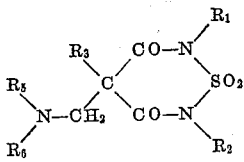

wherein $R_1$, $R_2$ and $R_3$ have the meanings given above and the grouping $R_5(R_6)N\text{---}CH_2\text{---}$ falls under the definition given above for $R_4$.

The simultaneous reaction of formaldehyde and a nitrogen compound of the general Formula VIII with a compound of the general Formula V can be performed for example by thoroughly rubbing together or, better still, heating the formaldehyde or paraformaldehyde and the two other reaction components in a moderately polar organic solvent such as, for example, methanol or ethanol. Particularly advantageous however, is the reaction in aqueous solutions, whereby, for example, an alkali salt of a compound of the general Formula V is reacted with an aqueous solution of formaldehyde and a nitrogen compound of the general Formula VIII.

The process according to the present invention is performed even more simply if a compound of the general Formula V is first reacted with a nitrogen compound of the general Formula VIII to form a salt and this is condensed in an aqueous or, for example, also alcoholic solution, with formaldehyde by allowing to stand for a long time or by heating. The resultant reaction products of the general Formula IX are either in the form of the inner salts or of the 4.4-disubstituted, non-ionisable compounds depending on whether the radical $R_3$ therein is or is not hydrogen. Generally both types of compound are only slightly soluble in water and diluted alkalies so that when being produced they separate out of the aqueous solution and in many cases can be isolated in a substantially pure form.

On the other hand, compounds of the general Formula IX can also be produced by reacting compounds of the general Formula V first with formaldehyde to form the corresponding 4-hydroxymethyl compounds of the general formula:

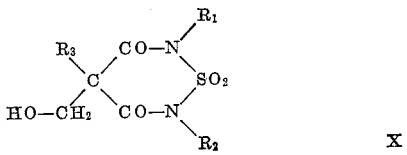

wherein $R_1$, $R_2$ and $R_3$ have the meaning given above, and reacting these with nitrogen compounds of the general Formula VIII.

If, as starting materials of the general Formula V, those are used in which $R_3$ represents hydrogen, if desired also two substituted aminomethyl radicals can be introduced by again reacting the reaction product of the general Formula IX obtained first, in which $R_3$ represents hydrogen, with formaldehyde and a nitrogen compound of the general Formula V.

Starting materials of the general Formula V are, for example, the substituted 3.5-dioxo-tetrahydro-1.2.6-thiadiazine-1.1-dioxides obtained by condensation of malonic acid or the monosubstituted malonic acids listed previously or reactive functional derivatives thereof with the substituted sulphamides which have also been listed above. Examples of nitrogen compounds of the general Formula VIII are dimethylamine, diethylamine, bis-($\beta$-hydroxyethyl)-amine, N-methyl aniline, N-formyl aniline and morpholine.

Another limited group of compounds which fall under the general Formula I is obtained by reacting a hydroxymethyl compound corresponding to the above general Formula X with a compound of the general Formula V to form a substituted 4.4'-methylene-bis-(tetrahydro-3.5-dioxo-1.2.6-thiadiazine-1.1-dioxide) of the general formula:

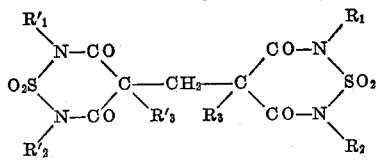

wherein $R_1$, $R_2$ and $R_3$ have the meanings given above and $R'_1$, $R'_2$ and $R'_3$ are identical to the radicals $R_1$, $R_2$ and $R_3$ or differ therefrom but still fall within the definitions given above for these radicals. The symmetrical compounds of the general Formula XI obtained in the first case can naturally be obtained in a single step from compounds of the general Formula V and formaldehyde, for which step advantageously an acid condensing agent, such as, for example hydrochloric acid, is used and a low molecular alcohol is used as solvent for example.

Compounds of the general Formula I in which at least one of the radicals $R_2$, $R_3$ and $R_4$ is hydrogen form water soluble salts with inorganic and organic bases. Compounds which due to substitution by basic groups are already in the form of inner salts are an exception to this rule. Aqueous solutions of alkali metal salts of suitable 2.6-disubstituted compounds react almost neutral, those of 2.4.6-trisubstituted compounds react only weakly alkaline so that they can also be administered parenterally.

Such alkali salts can be obtained in generally finely crystallised, durable and easily water soluble form from suitable solvents by careful evaporation (for example freeze-drying of an aqueous solution under reduced pressure) or by precipitation, for example by combination of concentrated solutions of sodium methylate in methanol and concentrated solutions of suitable compounds of the general Formula I given above in halogenated hydrocarbons or in ethers of a suitable boiling point, and possibly then by concentration under reduced pressure. In aqueous solutions of such salts, various compounds, in particular also the pharmacologically valuable substances of slighter water solubility, for example 4-dimethylamino-1-phenyl-2.3-dimethyl-pyrazolone - (5), are considerably more easily soluble than in pure water. The salts produced according to the present invention therefore can also be used as solubility promoters. In addition, compounds which correspond to the general Formula I as well as their salts can be used as intermediate products for the production of pharmaceutical preparations, of agents for combatting pests or for the production of other technically important compounds.

Compounds of the general Formula I in which $R_1$ represents a mononuclear aryl, mononuclear aralkyl, nitrophenyl or chlorophenyl radical, $R_2$ represents hydrogen, a lower alkyl, mononuclear aryl, mononuclear aralkyl, nitrophenyl or chlorophenyl radical, $R_3$ represents hydrogen, a lower aliphatic hydrocarbon radical, a mononuclear aryl, mononuclear aralkyl, mononuclear cycloalkyl, mononuclear cycloalkenyl or alkoxyalkyl radical, and $R_4$ represents hydrogen, a lower aliphatic hydrocarbon radical or a mononuclear aralkyl radical, are easily produced and have excellent antiphlogistic activity. Those compounds from this group are disguished by particularly favourable pharmacological properties in which $R_4$ represents hydrogen, $R_1$ and $R_2$ correspond to the definitions given above, in particular however they represent mononuclear aryl or mononuclear aralkyl radicals and $R_3$ corresponds to the definition given above, especially those compounds in which $R_3$ represents a lower aliphatic hydrocarbon radical or a mononuclear aryl radical.

The compounds according to the present invention can be used for the treatment of rheumatic complaints in the free form or as salts with inorganic or organic bases. They can be applied perorally in the form of tablets or dragées, which forms advantageously contain the active substances in the free form, or they can be administered rectally in the form of suppositories. The compounds according to the present invention can also be administered parenterally however, for example by intramuscular or intravenous injection of solutions of the free active substances or their salts, which solutions are prepared advantageously with the aid of the usual solubility promoters. Peroral or parenteral single doses for adults are, for example, 100–500 mg. of the compounds according to the present invention two to four times daily; for example two to four times 200 mg. of 4-allyl-2.6-diphenyl - 3.5 - dioxo - 1.2.6 -thiadiazine - 1.1 - dioxide. On administering in combination with other active ingredients, for example with 1-phenyl-2.3-dimethyl-4-dimethylamino-pyrazole-5-one, the single doses can be reduced to 50–300 mg., advantageously to 150 mg.

*Example 1*

4.28 parts of sulphanilide are dissolved in 50 parts by volume of abs. benzene in the warm; 3.38 parts of allyl malonic acid dichloride are added dropwise thereto at about 50° within half an hour. The mixture is stirred for 14 hours in all at about 70° and, after cooling, the benzene reaction solution is shaken out with 1 N-caustic soda lye. On acidifying the alkaline extract, the crude 4-allyl-2.6-diphenyl - 3.5 - dioxo - tetrahydro - 1.2.6 - thiadiazine-dioxide-(1.1) is obtained by precipitation. The pure compound melts at 141–142° after recrystallising from methanol.

The following compounds can be obtained by the process given above:

2.6-diphenyl- _____ M.P. 240–241° (decomposition).
4-methyl-2.6-diphenyl- _____ M.P. 226–228°.
4-ethyl-2.6-diphenyl- _____ M.P. 151–152°.
4-n-propyl-2.6-diphenyl- _____ M.P. 154–155°.
4-isopropyl-2.6-diphenyl- _____ M.P. 243–244°.
4-n-butyl-2.6-diphenyl- _____ M.P. 177–178.5°.
4-n-amyl-2.6-diphenyl- _____ M.P. 158–159°.
4-crotyl-2.6-diphenyl- _____ M.P. 184–185°.
4-propargyl-2.6-diphenyl- _____ M.P. 163–164°.
4-(2'.5'-endomethylene-Δ³'-cyclohexenyl)-2.6-diphenyl- _____ M.P. 238–240° (decomposition).
2.4.6-triphenyl- _____ M.P. 229–230°.
4-allyl-2-benzyl-6-phenyl- _____ M.P. 134.5–135.5°.
4-allyl-2.6-dibenzyl- _____ M.P. 132.5–133.5°.
2-phenyl-6-p-tolyl- _____ M.P. 232°.
4-allyl-2-phenyl-6-p-tolyl- _____ M.P. 143–144°.
4-allyl-2-phenyl-6-p-nitrophenyl- ___ M.P. 153–154°.
4-allyl-2-phenyl-6-m-nitrophenyl- __ M.P. 159–160°.
2.4-diphenyl-6-p-tolyl- _____ M.P. 230–234°.
2.4-diphenyl-6-m-nitrophenyl- _____ M.P. 214–215°.
4-phenyl-2.6-dibenzyl- _____ M.P. 167–168°.
4-benzyl-2.6-diphenyl- _____ M.P. 216–216.5°.
2.4-diphenyl-6-cyclohexyl- _____ M.P. 191–192°
4-cyclohexyl-2.6-diphenyl- _____ M.P. 247–248°.
4-cyclohexyl-2.6-dibenzyl- _____ M.P. 143–144°.
2-phenyl-4.6-dicyclohexyl- _____ M.P. 182–183°.
4-(2'.5'-endomethylene-clyclohexyl)-2.6-diphenyl- _____ M.P. 253–254°.
4-(2'.5'-endomethylene-cyclohexyl)-methyl-2.6-diphenyl- ___ M.P. 252–254°.
2-n-butyl-4-allyl-6-phenyl- _____ M.P. 67–68°.
2.4-diphenyl- _____ M.P. 192–193° (decomposition).
4-ethoxyethyl-2.6-diphenyl- _____ M.P. 141–142°.
4-diethylaminoethyl-2.6-diphenyl-
4-piperidinoethyl-2.6-dibenzyl-
4-pyridyl-(2')-methyl-2.6-diphenyl-
4-methyl-2-cyclohexyl-6-phenyl- ___ M.P. 194–195°.
4-allyl-2-cyclohexyl-6-phenyl- _____ M.P. 93.5–94.5°.
4-(Δ²'-cyclopentenyl)-2.6-diphenyl- M.P. 230–231°.
4-(Δ²'-cyclopentenyl)-2.6-dibenzyl- M.P. 158–159°.
4-methyl-2-phenyl- _____ M.P. 163–164°.
4-(Δ²'-cyclopentenyl)-2-phenyl- ___ M.P. 166–167°.
4-cyclopentyl-2.6-diphenyl-
4-cyclohexyl-2.6-diphenyl-
4-allyl-2.6-bis-(p-chlorophenyl)-
4-n-butyl-2.6-bis-p-tolyl-
4-benzyl-2.6-bis-(p-chlorophenyl)-
2.4-diphenyl-6-(p-chlorophenyl)-
4-diethylaminoethyl-2.6-diphenyl-
4-piperidinoethyl-2.6-dibenzyl-
4-(pyridyl-(2')-methyl)-2.6-diphenyl-
4-(γ-pyridyl-(4')-mercapto-propyl)-2.6-diphenyl-, and
4 - thienyl - 2.6-diphenyl-3.5-dioxo-tetrahydro-1.2.6-thiadiazine-1.1-dioxide.

*Example 2*

5.0 parts of sulphanilide and 5.0 parts of dimethyl aniline, each dissolved in 30 parts by volume of abs. ether, are added dropwise from two dropping funnels while stirring and cooling to a solution of 5.0 parts of [2.5-endomethylene-cyclohexyl-methyl]-malonic acid dichloride in 200 parts by volume of abs. ether, the additions being made slowly within one hour. The mixture is stirred for 2 hours at 0° and for another 6 hours at room temperature and then kept overnight. The ether is then decanted off the solid reaction product is treated with water and ether and the combined ether solutions are washed until the reaction is neutral. On shaking out repeatedly with N-caustic soda lye and acidifying the alkaline solution with hydrochloric acid, the 4-(2'.5'-endomethylene - cyclohexyl - methyl)-2.6-diphenyl-3.5-dioxo-tetrahydro-1-thia-2.6-diazine-dioxide-(1.1) is obtained in a solid form.

The compound crystallises from dichlorethane in the form of colourless needles which melt at 252–254° on decomposition.

The following compounds, among others, are obtained by the method described in this example:

4-allyl-2.6-diphenyl- _____ M.P. 141–142°
4-n-butyl-2.6-diphenyl- _____ M.P. 177–178°
4-phenoxyethyl-2.6-diphenyl-
4-methylmercapto-ethyl-2.6-diphenyl-
4-isopropylmercapto-ethyl-2.6-diphenyl-
4-phenylmercapto-ethyl-2.6-diphenyl-
4-phenylsulphinyl-ethyl-2.6-diphenyl-, and
4 - phenylsulphonyl - ethyl-2.6-diphenyl-3.5-dioxo-tetrahydro-1.2.6-thiadiazine-1.1-dioxide.

*Example 3*

A mixture of 70 parts by volume of phosphorus oxychloride, 22.4 parts of n-butyl malonic acid and 31 parts of sulphanilide is heated to 60° and the suspension obtained is stirred for a further 4 hours at 80–90°. Most of the excess phosphorus oxychloride is distilled off. Methanol is added to the residue under exterior cooling and stirring and then the resultant solid reaction product is filtered off under suction. After recrystallising from methanol, the 4-n-butyl-2.6-diphenyl-3.5-dioxo-tetrahydro-1.2.6-thiadiazine-1.1-dioxide is obtained in a pure form as colourless needles which melt at 176–178°.

In an analogous manner on condensing:

Malonic acid with sulphanilide, 2.6-diphenyl-3.5-dioxo-tetrahydro-1.2.6-thiadiazine-1.1-dioxide (M.P. 240–241°) is obtained, Malonic acid with N-phenyl-N'-p-tolyl-sulphamide, 2-phenyl - 6-p-tolyl-3.5-dioxo-tetrahydro-1.2.6-thiadiazine-1.1-dioxide (M.P.) 232°), is obtained, Malonic acid with N-phenyl-N'-N'-benzyl-sulphamide, 2 - phenyl - 6 - benzyl - 3.5 - dioxo - etrahydro - 1.2.6-thiadiazine-1.1-dioxide (M.P. 147–148°) is obtained.

*Example 4*

A solution of 3.14 parts of acetyl chloride in 10 parts by volume of benzene is added within 10 minutes while stirring to a suspension of 4.08 parts of the disodium salt of n-butyl malonic acid in 20 parts by volume of abs. benzene. The whole is then stirred for 1½ hours at a bath temperature of 55° and then cooled to 40°. 4.96 parts of sulphanilide and 4.85 parts of dimethyl aniline dissolved together in 75 parts by volume of benzene and 10 parts by volume of dimethyl formamide are added dropwise to the reaction mixture at this temperature, the addition being made within 2 hours. The bath temperature is then raised and the reaction mixture is boiled under reflux for 5 hours.

After cooling, a good amount of ether is added to the mixture and then it is washed first with diluted hydrochloric acid, then with water and finally with sodium bicarbonate solution. It is then shaken out several times with 2 N-caustic soda lye and a crystalline product is precipitated from the extract on acidification. After recrystallising from methanol, it melts at 177–178°. There is no depression of the melting point when the product is mixed with the 4-n-butyl-2.6-diphenyl-3.5-dioxo-tetrahydro-1.2.6-thiadiazine-1.1-dioxide obtained according to Example 1.

*Example 5*

4.74 parts of 2.6-diphenyl-3.5-dioxo-tetrahydro-1.2.6-thiadiazine-1.1-dioxide (produced according to Example 1 or 3) are suspended in 100 parts by volume of glacial acetic acid and then warmed with 2.65 parts of benzaldehyde while stirring. The undissolved part dissolves at a bath temperature of 110°. After heating for 3 hours at 110°, longish crystals separate from the reaction mixture which, after cooling, are filtered off under suction and washed with methanol. The 4-benzylidene compound is obtained. After recrystallising from ethyl acetate it is a pale yellowish product which melts at 222.5–224°. 2.02 parts of the 4-benzilidene - 2.6 - diphenyl - 3.5 - dioxo - tetrahydro - 1.2.6-thiadiazine-1.1-dioxide are suspended in 100 parts by volume of ethanol, the suspension is added to 1.0 part of palladium-calcium carbonate catalyst (about 1% in 20 parts of ethanol, previously hydrogenated), and the whole is shaken in a hydrogen atmosphere at room temperature under normal pressure. On completion of the hydrogen adsorption, the ethanol solution is filtered off and concentrated. The residue remaining with the catalyst is boiled out with chloroform, the solution obtained is shaken out with caustic soda lye and, on acidifying the alkaline extract, the 4-benzyl-2.6-diphenyl-3.5-dioxo-tetrahydro-1.2.6-thiadiazine-1.1-dioxide is obtained as a white precipitate. A smaller amount of the reaction product is dissolved in the ethanol. The compound melts, after recrystallisation from ethyl acetate, at 214.5–215.5°.

4-butylidene- (M.P. 204–205°), 4-cyclohexylidene- (M.P. 251–253°) or 4-(p-dimethylamino-benzylidene)-2.6-diphenyl-3.5-dioxotetrahydro - 1.2.6 - thiadiazine-1.1-dioxide can be produced by the method described in the first part of this example by condensation of, for example, 2.6-diphenyl - 3.5 - dioxo-tetrahydro-1.2.6-thiadiazine-1.1-dioxide with butyraldehyde, cyclohexanone or with p-dimethylamino-benzaldehyde.

4-n-butyl- (M.P. 177–178°),
4-cyclohexyl- (M.P. 247–248°), or
4-(p - dimethylamino-benzyl)-2.6-diphenyl - 3.5 - dioxo-tetrahydro-1.2.6-thiadiazine-1.1-dioxide (M.P. 195–196°)

are obtained therefrom by hydrogenation according to the method given in this example.

*Example 6*

3 parts of the 4-allyl-2.6-diphenyl-3.5-dioxo-tetrahydro-1.2.6-thiadiazine-1.1-dioxide obtained according to Example 1 are dissolved in a slight excess of about 0.2 N-caustic soda lye and the solution is added to a pre-hydrogenated suspension of 2 parts of palladium-calcium carbonate catalyst (about 1% palladium) in 40 parts by volume of ethanol. Hydrogenation under normal pressure at room temperature causes the calculated amount of hydrogen to be taken up even after 15 minutes.

After subseqeuntly shaking for several hours, no further hydrogen is taken up.

The catalyst is removed, the solution is acidified with diluted hydrochloric acid and, after further dilution with water, the 4-n-propyl-2.6-diphenyl-3.5-dioxo-tetrahydro-1.2.6-thiadiazine-1.1-dioxide is obtained.

After recrystallising from methanol, the substance melts at 154–155°; when mixed with the starting compound there is a noticeable depression of the melting point.

*Example 7*

15.8 parts of 2.6-diphenyl-3.5-dioxo-tetrahydro-1.2.6-thiadiazine-1.1-dioxide ("malonyl sulphanilide," produced according to Example 1 or 3) are added to a solution of 1.17 parts of sodium in 70 parts by volume of abs. methanol and dissolved by slightly warming in a water bath. After cooling, 250 parts by volume of ether are added while stirring. The sodium salt of 2.6-diphenyl-3.5 - dioxo-tetrahydro - 1.2.6 - thiadiazine-1.1-dioxide precipitates in fine, colourless small crystals which melt at 199–201° on decomposition. The sodium salt can be stored at room temperature without any noticeable decomposition; it dissolves easily in cold water and produces a practically neutral solution. The free "malonyl sulphanilide" is precipitated therefrom by acidification.

Titration shows that the sodium salt contains 0.99±0.03 equivalent alkali.

In a similar manner, for example from 4-allyl-2.6-diphenyl-3.5-dioxo-tetrahydro - 1.2.6 - thiadiazine - 1.1-dioxide with sodium methylate solution and chloroform, the sodium salt is obtained (brown coloured above 220°, (decomposition)), and with methanolic potassium lye, the potassium salt is obtained (M.P. over 200° (decomposition)).

The salts dissolve easily in water; for example at room temperature an aqueous solution can be produced which contains 500 mg. of the sodium salt dissolved in 1 millilitre of water (50% weight/vol.; solution A).

The high solubilising power of these alkali salt solutions can be seen from the following test:

Finely pulverized 1-phenyl-2.3-dimethyl-4-dimethyl-amino-pyrazolone-(5) ("aminophenazone") is added to 5 ml. of water and to 5 ml. of solution A until saturation is reached; small undissolved particles are filtered off and after drying, weighed. The following amounts of "aminophenazone" are dissolved:

| Temperature | water, g. | solution A, g. |
|---|---|---|
| 25° | 0.32 | 2.50 |
| 45° |  | 3.90 |

*Example 8*

1.58 parts of 2.6-diphenyl-3.5-dioxo-tetrahydro-1.2.6-thiadiazine-1.1-dioxide are dissolved by heating for a short time in a mixture of 0.53 part of morpholine and 15 parts by volume of methanol. After filtering, the morpholine salt of 2.6-diphenyl-3.5-dioxo-tetrahydro-1.2.6-thiadiazine-1.1-dioxide is obtained as colourless, longish prisms which melt at 129–130° by adding ether to the filtrate. The product completely dissolves in cold water; the solution has a pH value of about 6.5. Titration shows that the salt obtained in this way contains one equivalent base.

On recrystallising, for example, from dichloroethane, products having higher melting points are obtained. Because of their content of free 2.6-diphenyl-3.5-dioxo-tetrahydro-1.2.6-thiadiazine-1.1-dioxide, they are only partly water soluble and, according to titration, contain only 0.5–0.8 of an equivalent base. On the other hand the salt can be recrystallised unchanged by the addition of morpholine to the solvent.

Example 9

14.2 parts of propargyl bromide are added to a solution of 33.8 parts of the sodium salt of 2.6-diphenyl-3.5-dioxo-1.2.6-thiadiazine-1.1-dioxide (Example 7) in 300 parts by volume of abs. methanol and the whole is left for about 120 hours at room temperature. It is shaken several times throughout this period. The crystalline substance which separates during the reaction is filtered off. This contains regained free 2.6-diphenyl-3.5-dioxotetrahydro - 1.2.6-thiadiazine-1.1-dioxide. The methanol solution is evaporated and on treating the residue with alkali, 4.4-dipropargyl-2.6-diphenyl-1.2.6-thiadiazine-1.1-dioxide is obtained as side product. It is insoluble in alkali and it recrystallises from methanol in colourless needles which melt at 184–185°.

The main product of the reaction is 4-propargyl-2.6-diphenyl - 3.5 - dioxo-tetrahydro-1.2.6-thiadiazine-1.1-dioxide which melts at 161–163°; according to the mixed melting point and a comparison of the spectra, the compound is identical to that produced in Example 1 which melts at 163–164°.

By subsequent substitution with $\Delta^2$-cyclopentenyl chloride (B.P.$_{35}$ 36–38°), the 4-($\Delta^{2\prime}$-cyclopentenyl)-2.6-diphenyl - 3.5-dioxotetrahydro-1.2.6-thiadiazine-1.1-dioxide (M.P. 227–230°) already produced according to Example 1, is obtained.

Example 10 (subsequent propargylation of the 4-n-butyl derivative)

3.72 parts of 4-n-butyl-2.6-diphenyl-3.5-dioxo-tetrahydro-1.2.6-thiadiazine-1.1-dioxide (produced according to Example 1, 3 or 4) and 1.2 parts of propargyl bromide are added while stirring to a solution of 0.23 part of sodium in 25 parts by volume of tert. butanol (anhydrous). After 40 minutes, the mixture is heated and is then stirred for 6 hours at 80–100° bath temperature. The precipitate formed (mostly sodium bromide) is filtered off and the solution is evaporated to dryness. A slight amount of unchanged starting material can be separated from the crude product by shaking the ether solution with caustic soda lye. On recrystallisation from methanol, the alkali insoluble 4-n-butyl-4-propargyl-2.6-diphenyl-3.5-dioxo-tetrahydro-1.2.6-thiadiazine-1.1 - dioxide is obtained in colourless prisms which melt at 156–157°.

The following 4.4-disubstituted compounds for example can be produced in a corresponding manner:

4.4-dipropargyl-2.6-diphenyl-3.5-dioxo-tetrahydro-1.2.6-thiadiazine-1.1-dioxide (M.P. 184–185°) from 2.6-diphenyl-1.2.6-thiadiazine-1.1-dioxide, see Example 9.

4 - butyl-4-allyl-2.6-diphenyl-3.5-dioxo-tetrahydro-1.2.6-thiadiazine-1.1-dioxide, M.P. 115–116°, from the 4-butyl compound, and 4-butyl-4-benzyl-2.6-diphenyl-3.5-dioxo-tetrahydro-1.2.6-thiadiazine-1.1-dioxide, M.P. 174–175°, also from the 4-butyl compound; also from the 4-allyl compound are produced: 4-phenacyl-4-allyl-2.6-diphenyl-3.5-dioxo-tetrahydro-1.2.6-thiadiazine-1.1-dioxide (M.P. 214°), 4-carbethoxymethyl-4-allyl-, 4-carbocyclohexyloxy-methyl-4-allyl-, 4-diethylcarbamylmethyl-4-allyl- and 4-phenylcarbamylmethyl-4-allyl- 2.6-diphenyl-3.5-dioxotetrahydro-1.2.6-thiadiazine-1.1-dioxide by reacting with ω-bromoacetophenone, α-bromo acetic acid ethyl ester, α-bromo-acetic acid cyclohexyl ester, α-bromo-N.N-diethyl acetamide or α-bromo-acetanilide respectively.

In an analogous manner are also obtained:

| | |
|---|---|
| 4-crotyl-4-n-butyl- | M.P. 113–114° |
| 4.4-dibenzyl- | M.P. 168–169° |
| 4-phenacyl-4-n-butyl-2.6-diphenyl-3.5-dioxo-tetrahydro-1.2.6-thiadiazine-1.1-dioxide | M.P. 210–211° |

Example 11

15.8 parts of 2.6-diphenyl-3.5-dioxo-tetrahydro-1.2.6-thiadiazine-1.1-dioxide are thoroughly mixed in a mortar with 2.5 parts of p-formaldehyde and then rinsed in a flask with methanol. On adding 10 parts by volume of 33% aqueous dimethylamine solution the temperature rises; a clear solution is obtained which, on cooling completely crystallises. It is left to stand at room temperature for 36 hours, cooled in the refrigerator and the precipitate is filtered off. After recrystallising from methanol, the 4 - (dimethylaminomethyl) - 2.6 - diphenyl-3.5-dioxotetrahydro-1.2.6-thiadazine-1.1-dioxide obtained melts at 202–203.5°.

The following compounds can also be produced in a corresponding manner:

| | |
|---|---|
| 4-diethylaminomethyl- | M.P. 163–164°. |
| 4 - [di - (2' - hydroxyethyl) - amino-methyl]- | M.P. 134–135°. |
| 4-(4'-morpholino)-methyl- | M.P. 187–190° (decomposition). |
| 4-(N-phenyl)-methylaminomethyl- and | M.P. 168–171°. |
| 4 - (N-phenyl) - formylaminomethyl-2.6-diphenyl-3.5 - dioxo-tetrahydro-1.2.6-thiadiazine-1.1-dioxide | M.P. 187–190°. |

Example 12

15.8 parts of 2.6-diphenyl-3.5-dioxo-tetrahydro-1.2.6-thiadiazine-1.1-dioxide are dissolved in 52 parts by volume of 1 N-caustic soda lye (or the sodium salt obtained according to Example 7 is dissolved in the corresponding amount of water), 5 parts by volume of 38% aqueous formaldehyde solution and 5.7 parts by volume of diethylamine are added and the whole is kept for 36 hours at room temperature and then overnight in the refrigerator. Almost pure 4-(diethylaminomethyl)-2.6-diphenyl-tetrahydro-1.2.6-thiadiazine-1.1-dioxide crystallises from the solution and, after recrystallisation from methanol, it melts at 163–164°.

For example from the sodium salt of 4-allyl-1.2.6-dibenzyl-3.5-dioxo-tetrahydro-1.2.6-thiadiazine-1.1 - dioxide with morpholine and formaldehyde, the 4-morpholinomethyl-4-allyl-2.6-dibenzyl-3.5 - dioxo-tetrahydro - 1.2.6-thiadiazine-1.1-dioxide (M.P. 113–114°) is also obtained by this process.

Example 13

6.32 parts of 2.6-diphenyl-3.5-dioxo-tetrahydro-1.2.6-thiadiazine-1.1-dioxide and 2 parts of morpholine are dissolved while slightly heating in 25 parts by volume of water. 2 parts by volume of 38% formaldehyde solution are added while shaking whereupon the temperature of the mixture rises and after a short time it becomes solid by the crystallisation of the reaction product. The mass is diluted with about 10 parts by volume of water, left to stand for 48 hours at room temperature. After cooling, the precipitate is filtered off under suction and washed with water. On recrystallising from diluted ethanol, a substance which melts at 187–189° (on decomposition) is obtained in pure form. This compound is identical to the compound named in Example 11 and is clearly different from the morpholine salt of the starting product described in Example 8.

Example 14

1.86 parts of 4-butyl-2.6-diphenyl-3.5-dioxo-tetrahydro-1.2.6-thiadiazine-1.1-dioxide, produced for example according to Example 1, 2 or 3, are dissolved in 15 parts by volume of acetone and 0.05 part by volume of concentrated hydrochloric acid and 4 parts by volume of 38% aqueous formaldehyde are added. It is left to stand for 5 days at room temperature, concentrated in the vacuum and, on dissolving in methanol and carefully precipitating by the addition of water, a colourless product is obtained which melts at 130–132°, which is identified as 4-hydroxymethyl - 4 - n - butyl - 2.6-diphenyl-3.5-dioxo-tetrahydro-1.2.6-thiadiazine-1.1-dioxide.

1.5 parts of this compound are suspended in 5 parts by volume of ethanol and 0.4 part of morpholine are added whereupon the substance dissolves and slight heat is generated. It is left to stand overnight, and the precipitate formed is filtered off. On recrystallising from chloroform-di-isopropyl ether, the 4-morpholino-methyl-4-n-butyl-2.6-diphenyl - 3.5 - dioxo-tetrahydro-1.2.6-thiadiazine-1.1-dioxide is obtained in a pure form (M.P. 179–181.5°). The formula is confirmed by analysis and the spectrum.

In an analogous manner, for example from 2.6-diphenyl - 3.5 - dioxo - tetrahydro - 1.2.6 - thiadiazine - 1.1-dioxide, the following compounds are obtained:

4-hydroxymethyl- _____ M.P. 152–154°.
4.4′-methylene-bis- _____ M.P. 247–250°.
and
4 - diethylaminomethyl - 2.6 - diphenyl-
3.5 - dioxo - tetrahydro-1.2.6-thiadiazine-1.1-dioxide _____ M.P. 162–164°.

What I claim is:

1. A member selected from the group consisting of a 3.5-dioxotetrahydro-1.2.6-thiadiazine-1.1-dioxide derivative of the formula:

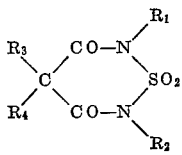

wherein:

$R_1$ represents a member selected from the group consisting of phenyl, methylphenyl, nitrophenyl, chlorophenyl and benzyl, $R_2$ represents a member selected from the group consisting of hydrogen, lower alkyl, phenyl, methylphenyl, nitrophenyl, chlorophenyl and benzyl, $R_3$ represents a member selected from the group consisting of hydrogen, lower alkyl, lower alkenyl, lower alkynyl, phenyl, benzyl, cyclopentyl, cyclohexyl, cyclopentenyl, 2′.5′ - endomethylene-cyclohexyl, 2′.5′ - endomethylene-cyclohexylmethyl, 2′.5′ - endomethylene-$\Delta^{3'}$-cyclohexenyl and lower alkoxy-lower alkyl, and $R_4$ represents a member selected from the group consisting of hydrogen, lower alkyl, lower alkenyl, lower alkynyl and benzyl, and the pharmaceutically acceptable alkali metal salts and morpholine salts thereof.

2. 4-allyl-2.6-diphenyl-3.5-dioxo-tetrahydro - 1.2.6-thiadiazine-1.1-dioxide.

3. 4-isopropyl-2.6-diphenyl-3.5-dioxo-tetrahydro - 1.2.6-thiadiazine-1.1-dioxide.

4. 2.6-dibenzyl-4-phenyl-3.5-dioxo - tetrahydro - 1.2.6-thiadiazine-1.1-dioxide.

References Cited in the file of this patent
UNITED STATES PATENTS
2,473,042    Walter _____ June 14, 1949

OTHER REFERENCES
Paquin: Angew. Chemie, vol. A–60 (1948), pp. 316–320.